July 2, 1946.  A. R. DIAMOND ET AL  2,402,952
ROLLER GUIDE
Filed Sept. 22, 1944  2 Sheets-Sheet 1

INVENTORS.
ARTHUR R. DIAMOND
WILLIAM STEVER
BY John P. Tarbox
ATTORNEY

July 2, 1946.  A. R. DIAMOND ET AL  2,402,952
ROLLER GUIDE
Filed Sept. 22, 1944   2 Sheets-Sheet 2

INVENTORS
ARTHUR R. DIAMOND
WILLIAM STEVER
BY John P. Tarbox
ATTORNEY

Patented July 2, 1946

2,402,952

UNITED STATES PATENT OFFICE 2,402,952

ROLLER GUIDE

Arthur R. Diamond and William Stever, Philadelphia, Pa., assignors to Edward G. Budd Manufacturing Company, Philadelphia, Pa., a corporation of Pennsylvania Application September 22, 1944, Serial No. 555,223

7 Claims. (Cl. 219—4)

This invention relates to a roller guide, particularly to a welding roller guide, and has for an object the provision of improvements in this art.

It is always desirable to have a welding roller follow accurately a desired course, usually a straight line, in order that the weld line may be strong and of good appearance. It is particularly desirable that the course be accurate when the welds are to be peened in order that the weld line and only the weld line be peened. If the welding roller be accurately guided and the peening tool is similarly guided the desired effect will be achieved. When hand operated portable roller welders are used it is not easy for the operator to guide the rolls in an accurate path, hence suitable guiding means are needed.

It is an object of the present invention to provide suitable means for guiding welding rolls and stock relative to each other so as to form an accurate line of welds. Another object is to provide guide means of a simple form. Another object is to provide guide means which can be quickly applied to and removed from the rolls.

Other objects and features will be apparent from the following description of an exemplary embodiment of the invention, reference being made to the accompanying drawings thereof, wherein.

Figure 1:
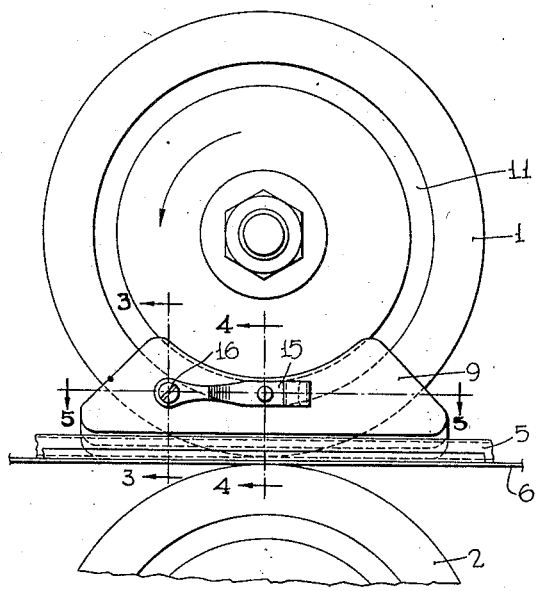
Fig. 1 is a side elevation of a roller welder embodying the present invention.
Figure 3:
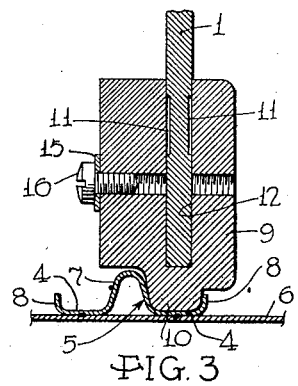
Fig. 3 is a transverse section taken on the line 3—3 of Fig. 1.
Figure 2:
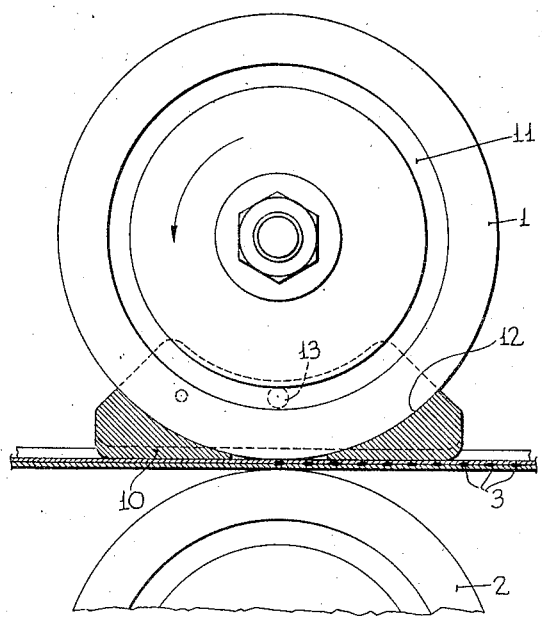
Fig. 2 is a side elevation of the rolls and a longitudinal section through the guide, the section being taken on the line 2—2 of Fig. 4.
Figure 4:
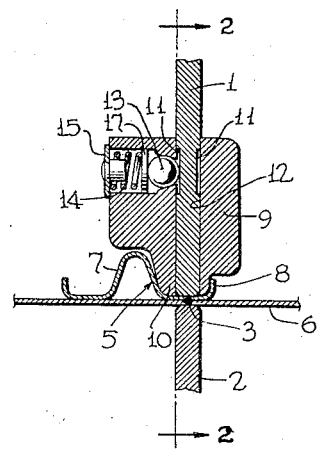
Fig. 4 is a transverse section taken on the line 4—4 of Fig. 1.
Figure 5:
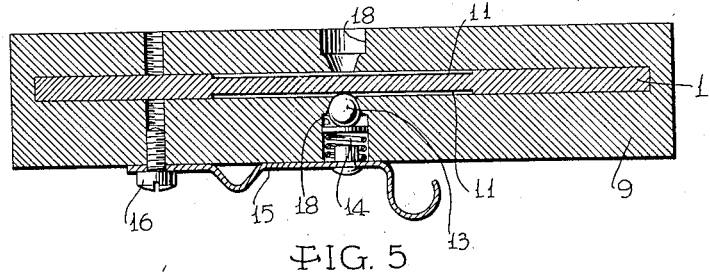
Fig. 5 is a longitudinal section taken on the line 5—5 of Fig. 1.

Referring to Figs. 1 to 5, it is assumed that the rolls 1, 2, mounted on a portable yoke not shown, are to make a line of welds 3 securing a flange 4 of a stringer 5 to a sheet 6. The other flange of the stringer may be secured by a similar line of welds to the sheet. In this form it is assumed that the welding roller 1 is guided between the central ridge 7 of the stringer and a high return flange 8 on the outer edge of the side flange 4 which is to be welded.

Upon the upper roller 1 there is mounted a shoe-like guide 9 which slides along the roller and stringer while the roller rolls along the flange of the stringer. The guide is provided with a lower portion 10 which closely but not tightly fits between the return flange 8 and the side of the ridge 7.

The roller 1 is provided with an annular retaining groove 11 on one or both sides and the guide is provided with a longitudinal arcuate slot 12 to receive the roller. The guide is also provided with retaining means, such as a ball 13, adapted to ride in the groove 11 of the roller. The ball is held in the groove 11 by any suitable means, such as a spring 14, the spring being held down by a holder, such as the leaf spring 15 anchored by a screw 16 to the side of the guide 9. A plate 17 may be interposed between the ball and the spring to promote easy turning of the ball. The ball 13, spring 14, and plate 17 are disposed in a recess 18 in the guide 9 and there is another recess 18 in the other side of the guide to permit the ball to be placed in the groove 11 in the other side of the roller, the holding leaf spring 15 and its screw 16 being transferred with the other parts.

The ball 13 has side play in the groove 11 to provide radial movement between the guide 9 and roller 1 thus permitting the roller, which projects through the bottom of the guide, to freely engage the stock for welding and permitting the guide to drop down by its own weight into the channel of the stringer and accurately guide the roller. Then if the guide should be required to travel up or down curved surfaces it will still guide accurately without binding.

Figure 6:
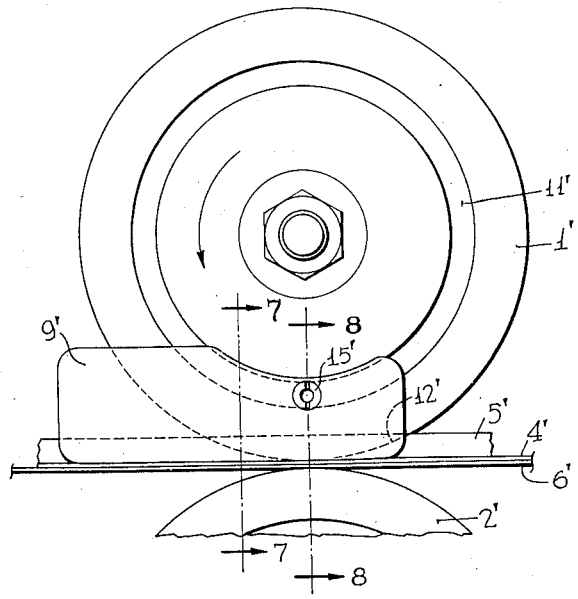
Fig. 6 is a side elevation of a modification.
Figure 8:
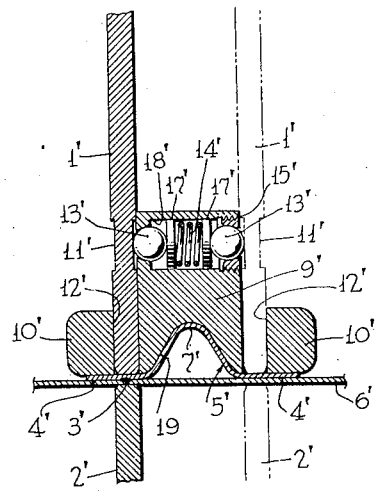
Fig. 8 is a transverse section taken on the line 8—8 of Fig. 6.
Figure 7:
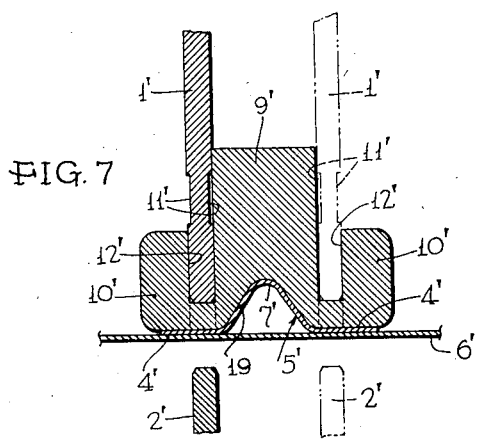
Fig. 7 is a transverse section taken on the line 7—7 of Fig. 6.

The form shown in Figs. 6 to 8 is similar in general to the form shown in Figs. 1 to 5 but is designed to guide along the ridge of the stringer, as where the side flanges are not provided with return flanges. Moreover, provision is made for using two pairs of welding rollers and welding both flanges to the sheet at one time.

Here the rolls 1', 2' make lines of welds 3' along the flanges 4' of a stringer 5' securing it to a sheet 6'. The welding rollers are guided along the ridge 7' of the stringer 5' by a shoe-like guide 9' which is provided with lower portions 10' on the sides of a groove 19 which closely but not tightly fits upon the ridge of the stringer.

The rollers 1' are provided with an annular retaining groove 11' on one or both sides and the guide is provided with longitudinal arcuate slots 12' to receive the rollers 1'. The guide is also provided with retaining means, such as balls 13' adapted to ride in the grooves 11' of the rollers. The balls are held in the grooves 11' by any suitable means, such as a spring 14' disposed between them, the balls being retained in a recess 18' by a ring nut 15'. Plates 17' are provided between the spring and the balls.

When the guide straddles and follows the ridge of a stringer, as in the second form, it is found that one end of the guide may be shortened, as shown in Fig. 6, and this reduces the likelihood of crushing the ridge when the guide is moving up a curved surface.

The guide described causes the rollers to place accurate lines of welds in the stock, whether the welder be moved along the stock or the stock is moved past the rolls. When referring to the guides as roller guides it will be understood that they function as well to guide the stock if the rolls should occupy a fixed position. It will be assumed that the stringers are accurately located on the sheet before welding as by tack welding while the parts are gauged or held in a templet.

While the invention has been described in specific form for purposes of illustration it will be understood that there may be various embodiments within the limits of the prior art and the scope of the subjoined claims.

What is claimed is:

1. Apparatus for keeping a roller and stock guide element in alignment as for welding, comprising in combination, a roller, a guide, means retaining the roller and guide together at all times and providing relative turning movement therebetween during rotation of the roller, and means on the guide adapted to follow the stock guide element during relative travel between the roller and stringer.

2. Apparatus for keeping a roller and stock guide element in alignment as for welding, comprising in combination, a roller provided with annular retaining means, a guide provided with means securing it to the annular retaining means of the roller and permitting rotation of the roller relative to the guide, and means on the guide adapted to follow the stock guide element during relative travel between the roller and stringer.

3. Apparatus for keeping a roller and stock guide element in alignment, comprising in combination, a roller provided with an annular retaining element on the side, a guide provided with a slot receiving said roller and a retaining element riding along and retained by said retaining element, and means on the guide riding along the stock guide element.

4. Apparatus for keeping a roller and stock guide element in alignment, comprising in combination, a roller provided with an annular retaining track on the side, a guide provided with a slot receiving said roller and a retaining element riding along and retained by said track, and means on the guide riding along the stock guide element, said retaining means comprising a spring-pressed ball operating on the annular track of the roller.

5. Apparatus for keeping a roller and stock guide element such as a stringer in alignment, comprising in combination, a roller provided with an annular retaining groove in the side, a guide provided with a slot receiving said roller and a retaining element riding in said groove, and means on the guide riding along the stock guide element, said retaining means comprising a spring-pressed ball and the groove in the roller being over-width to permit radial play between the roller and guide.

6. Apparatus for keeping a roller and stringer in alignment, comprising in combination, a roller, and a guide secured thereon which rides on and guides along the stringer as the roller turns relative to the guide, said guide projecting a greater distance on one side of the stringer engaging point of the roller than on the other.

7. Apparatus for keeping rollers and a stringer in alignment, comprising in combination, a pair of rollers, and a guide riding on the rollers and a stringer, said rollers having annular grooves in the side, said guide having retaining means in said grooves, and said guide having a groove fitting a ridge of the stringer between the rollers.

ARTHUR R. DIAMOND.
WILLIAM STEVER.